3,701,753
SOLUTIONS OF ROOM TEMPERATURE VULCANIZABLE SILICONE RUBBER COMPOSITIONS
Harvey P. Shaw, Troy, N.Y., assignor to
General Electric Company
No Drawing. Filed Sept. 28, 1970, Ser. No. 76,266
Int. Cl. C08b 23/00
U.S. Cl. 260—9 R    8 Claims

ABSTRACT OF THE DISCLOSURE

A room temperature vulcanizable solution which is applied to surfaces and cured in situ to form a tough film over said surface comprising a silicon rubber composition containing (i) a silanol-terminated diorganopolysiloxane base polymer with a viscosity in the range of 1,000 to 100,000 centipoises at 25° C. and (ii) an organotriacyloxysilane. The silicone rubber composition is dissolved in an organic solvent, preferably cyclohexane, and applied to said surface.

BACKGROUND OF THE INVENTION

This invention relates to one-package room temperature vulcanizable compositions and, in particular, to solutions of one-package room temperature vulcanizable compositions which can be applied to surfaces and cured in situ to the surface with a tough, smooth film.

Room temperature vulcanizable silicone rubber compositions are well known. In the copending application of Warren R. Lampe, Docket No. 8SI-1133, Ser. No. 76,265, filed Sept. 28, 1970 entitled "Room Temperature Vulcanizable Silicone Rubber Compositions" assigned to the same assignee, there is disclosed a thixotropic room temperature vulcanizable silicone rubber composition which has a paste-like consistency, with little tack in the pre-cured state and is particularly suitable for forming ear plugs therefrom. The form of the ear plugs is disclosed in the copending application of Theodore K. Johnson and Joseph Sataloff, Docket No. 8MD-25, Ser. No. 75,877, filed September 28, 1970 and entitled "Hearing Protecting Device," which is assigned to the same assignee as the present application. This composition comprises a linear, high molecular weight fluid diorganopolysiloxane containing silicon-bonded hydroxy groups and having a viscosity of $3 \times 10^6$ to $2 \times 10^8$ centipoises when measured at 25° C. which may be blended with 0–100% by weight of a linear, low molecular weight fluid diorganopolysiloxane containing terminal silicon-bonded hydroxy groups and having a viscosity of 100 to $3.0 \times 10^5$ centipoises at 25° C. wherein the blend has a viscosity of $3 \times 10^6$ to $25 \times 10^6$ centipoises at 25° C. The above blend of diorganopolysiloxanes is mixed with a filler, and alkyl silicate as the cross-linking agent and a metallic salt of an organic monocarboxylic acid to form the resulting silicone rubber composition. The metallic salt and the alkyl silicate cross-linking agent are separately packaged and when it is desired to cure the composition they are mixed with the filler and diorganopolysiloxane and the resulting mixture is inserted into the ear and allowed to cure in place to form the ear plug in situ.

While the above silicone rubber compositions form good ear plugs for the attenuation of sound, it has been found desirable to improve these ear plugs. Thus, ear plugs which are made as above do not have a uniform, smooth surface but have a roughened surface. Further, wax and perspiration cling to the ear plug and after some period of use impart to the ear plug an unhygienic appearance and color. In addition, the ear plugs do not fit as tightly into the ear canal as would be desired.

In order to obviate the above disadvantages, it has been proposed to coat the ear plugs with a silicone rubber coating. However, such a coating must cure at room temperature so that the ear plugs can be processed quickly. Further, such a coating must have acceptable toxicological properties so that it will not have toxicity effects when it comes into contact with the skin on different members of the body, such as the ear.

In addition, it has long been desired that an acceptable room temperature silicone rubber composition solution be formulated. With said solution, particular surfaces can be coated by simply dissolving the pre-cured silicone rubber composition in a solution and then applying the solution to the surface to be coated. The solvent evaporates away leaving the silicone rubber composition on the surface which then cures to leave a film thereover. It has been especially difficult to find suitable solvents for one-package room temperature vulcanizable silicone rubber compositions since the solvent must not be hydroscopic, otherwise the composition has a very short shelf life. Another requirement is that the solvent must completely dissolve the pre-cured silicone rubber composition so that a film of uniform thickness can be formed from the solution. If the solvent does not completely dissolve the silicone rubber composition, then globules of silicone rubber composition will be present in the film which will lower the physical properties of the film.

It is an object of the present invention to provide coatings for ear plugs which will impart a smooth surface to the ear plugs and render them resistant to wax and moisture.

It is another object of the present invention to provide a uniform solution of room temperature vulcanizable silicone rubber composition so that silicone rubber films or coatings may be formed from the composition.

It is yet another object of the present invention to provide a room temperature silicone rubber solution with acceptable toxicological properties.

SUMMARY OF THE INVENTION

In accordance with the present invention there is now provided a room temperature vulcanizable silicone rubber solution comprising (a) a silicone rubber composition having (i) a base polymer of the formula, (1) 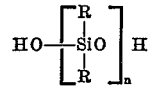

where R is a member selected from the class consisting of monovalent hydrocarbon radicals, halogenated monovalent hydrocarbon radicals, and cyanoalkyl radicals and $n$ has a value of 10 to 1000 such that the viscosity of the base polymer varies from 1,000 to 100,000 centipoises at 25° C. and (ii) an organotriacyloxysilane of the formula, (2) 

where R' is a member selected from the class consisting of monovalent hydrocarbon radicals, halogenated monovalent hydrocarbon radicals, and cyanoalkyl radicals and Y is a saturated aliphatic monoacyl radical of a carboxylic acid, and (b) an organic solvent that is preferably cyclohexane.

When the base polymer has a viscosity of 8,000 to 100,000 centipoises at 25° C., the silicone rubber composition is thixotropic and can be present at a concentration of 5–70% by weight in said solvent.

When the base polymer has viscosity of 1,000 to 7,000 centipoises at 25° C. the silicone rubber composition is self-leveling and can be present at a concentration of 10–95% by weight in said solvent.

DETAILED DESCRIPTION OF THE PREFERRED EMBODIMENT

The liquid diorganopolysiloxane of Formula 1 can comprise a single specie or a plurality of species having a viscosity of 1,000 to 100,000 centipoise at 25° C. and which contains an average of from about 1.85 to 2.01 silicon-bonded organic radicals per silicon atom with the organic radicals being attached to silicon through silicon-carbon linkages and with there being present in the base polymer from about 0.02 to 2.0 percent by weight silicon-bonded hydroxyl groups.

The group R of Formula 1 includes, for example, alkyl radicals such as methyl, ethyl, propyl, butyl, octyl; aryl radicals such as phenyl, naphthyl and tolyl; arylalkyl radicals such as benzyl and phenylethyl; alkenyl radicals such as ethylphenyl; alkenyl radicals such as vinyl and allyl; cycloaliphatic radicals such as cyclohexyl, cycloheptyl and cyclohexenyl; haloalkyl and haloaryl such as chloromethyl, alpha-chloroethyl, beta-chloroethyl, chlorophenyl, dibromophenyl, trifluoromethylphenyl and trifluoromethylpropyl; and cyanoalkyl radicals such as cyanomethyl, beta-cyanoethyl, beta-cyanopropyl, gamma-cyanopropyl and omega-cyanobutyl. The R groups on the same silicon atom may be the same or different such as methylphenyl and further the base polymer might to a copolymer, that is it would have dimethyl, diphenyl, methylphenyl and other groups bonded to the silicon atom in the chain. The preferred radicals for R are methyl and phenyl.

The preferable base polymers of the present invention are those set forth in Formula 1. In addition to the linear silanol chain-stopped diorganopolysiloxane of Formula 1, the base polymer can also contain some molecules containing linear diorganosiloxane chains which are terminated at one end with triorganosiloxane units having the formula:

$$(R)_3SiO_{1/2}$$

with the other end of the chain being terminated by silanol groups where R is as previously defined. Such base polymers having a viscosity of 1,000 to 7,000 centipose and preferably 1,000 to 3,000 centipoise, are especially suitable for the self-leveling room temperature vulcanizable silicone rubber compositions while the base polymers of Formula 1, that is, having silanol groups at both ends of the chain and having a viscosity of 8,000 to 100,000 centipoise and preferably 10,000 to 15,000 centipoise at 25° C. are especially suitable for thixotropic room temperature vulcanizable compositions. Further, the polymer chains can also contain some molecules containing monoorganosiloxane units having the formula, $$RSiO_{3/2}$$

where R is as previously defined.

The production of the base polymers of Formula 1 is well known in the art. Halosilianes are hydrolyzed to product short chain polymers. These short chain polymers are reacted in the presence of a catalyst to form cyclosiloxanes, most of which are cyclotrisiloxanes and cyclotetrasiloxanes. These cyclosiloxanes are obtained in pure form and subjected to equilibration treatment in the presence of a catalyst. Generally, 5 to 10 parts per million of KOH is used as the catalyst and the equilibration is carried out at 150–170° C. until 85 percent of the cyclosiloxanes have been converted to long chain polymers. Water may be added, such as 0.5 part of water per 100 parts of cyclosiloxanes so as to limit the chain lengths of the polymers that are formed. After the equilibration reaction has reached 85 percent conversion, an acid liberator is added to the equilibration mixture to neutralize the KOH and the remaining cyclosiloxanes are distilled off. If desired, instead of water being added to the equilibration mixture the high molecular weight polymers are subjected to steam so as to decrease the viscosity to between 1,000 to 100,000 centipoise at 25° C. Further, the viscosity can be lowered to between 1,000 to 7,000 centipoise at 25° C. for the self-leveling silicone rubber composition or between 8,000 to 100,000 centiposes for the thixotropic silicone rubber compositions.

The organotriaryloxysilanes of Formula 2 are well known in the art. In these compounds, the acyl radical represented by Y is of the scope previously described, with the preferred Y radicals being those containing up to 4 carbon atoms and with the preferred Y radicals being acetyl. The R' group of Formula 2 is of the same scope as the R group of Formula 1 but preferably is a lower alkyl radical such as methyl, ethyl, propyl, butyl, octyl, etc., or is a single aryl radical such as phenyl or tolyl. Further, R' may be aralkyl, alkoxy, alkynyl, alkenyl, cycloalkyl, acyloxyalkyl and acyloxyalkenyl radicals. The preferred specific composition within the scope of Formula 2 is methyltriacetoxysilane.

The silicone rubber composition may also contain a dialkoxydiacyloxysilane having the formula, (3) $$(RO)_2Si(OY)_2$$

where R is a lower alkyl radical such as methyl, ethyl, propyl, butyl, etc., and Y has the same meaning as previously defined. The dialkoxydiacyloxysilane of Formula 3 is added to the composition in that it promotes adhesiveness of the silicone rubber compositions to surfaces such as stainless steel, glass and aluminum.

The silanes of Formula 2 are readily prepared from known compositions and the simplest method of preparation involves the reaction of organotrichlorosilane with the anhydride of the acid represented by Y in Formula 2. For example, in the preparation of silanes within the scope of Formula 2 wherein Y is acetoxy, methyltrichlorosilane is reacted with acetic anhydride to produce the methyltriacetoxysilane.

The compounds of Formula 3 may be prepared in a similar manner. For example, in the preparation of silanes within the scope of Formula 3 wherein Y is acetoxy, silicon tetrachloride is reacted with acetic anhydride to produce silicon tetraacetates. The silicon tetraacetate is then reacted with an appropriate alcohol to produce the compositions within the scope of Formula 3.

There may also be added to the base polymer a hydrolyzate fluid composed of $(R^2)_3SiO_{1/2}$ units, $(R^2)_2SiO$ units, $R^2SiO_{3/2}$ units and having therein hydroxyl groups. The hydrolyzate is preferably prepared by simply hydrolyzing chlorosilanes and then utilizing the resulting mixture of siloxane fluid that is formed. In the hydrolyzate there is preferably 5 mole percent of the $(R^2)_3SiO_{1/2}$ units, therefore 70 mole percent of the $(R^2)_2SiO$ units and 20 mole percent of the $R^2SiO_{3/2}$ units with 0.5 weight percent of silanol groups. This hydrolyzate composition is preferably added to the base polymer to increase the adhesiveness of the resulting silicone rubber composition.

The room temperature vulcanizing silicone rubber compositions are prepared by simply mixing the diorganopolysiloxane base polymer with the hydrolyzate, the dialkoxydiacyloxysilane and the organotriacryloxysilane. Since both the dialkoxydiacyloxysilane of Formula 3 and the organotriacyloxysilane of Formula 2 tend to hydrolyze and cross-linking with the base polymer upon exposure to moisture in the atmosphere, care is taken to exclude moisture during the mixing of the cured components. Further, care should be exercised to exclude moisture from the mixture of base polymer, hydrolyzate, organotriacyloxysilane and dialkoxydiacyloxysilane when it is desired to store the mixture for extended periods of time in a liquid state prior to conversion of the material to the cured, solid, elastomeric silicone rubber state. On the other hand, if it is desired to permit the mixture to cure immediately upon addition of the dialkoxydiacyloxysilane and organotriacyloxysilane to the base polymer and hydrolyzate, no special precautions need be taken and the materials may be mixed and placed in solution under anhydrous conditions.

There may be used generally 2.0 to 6.0 percent by weight of said base polymer of organotriacyloxysilane and preferably 2.0 to 4.0 percent by weight. Further, there may be utilized 0.2 to 6.0 percent by weight of said base polymer of the dialkoxydiacyloxysilane and preferably 1.0 to 3.0 percent by weight. Although the hydrolyzate need not be added to the composition, there is utilized in the present silicone rubber compositions up to 2.0 percent by weight of the base polymer of the hydrolyzate to promote the adhesiveness of the silicone rubber composition.

The above ingredients may be added together at any convenient temperature since the temperatures of mixing do not effect the properties of the final mixture. Conveniently, the mixing is carried out at room temperature or at a temperature in the range of 20°–80° C.

It is often desirable to modify the compositions of the present invention by addition of various materials which act as extenders or which change various properties, such as cure rate, color, or cost. For example, if it is desired to reduce the time required for complete cure by a factor of from about 2 to 5 without affecting the work life of the room temperature vulcanizing composition, the composition can be modified by the incorporation of a minor amount of a carboxylic acid salt of a metal ranging from lead to manganese, inclusive, in the electromotive series of metals. The particular metals included within this scope are lead, tin, nickel, cobalt, iron, cadmium, chromium, zinc and manganese. The specific metal ion which is preferred is tin. The carboxylic acids from which the salts of these metals are derived can be monocarboxylic acids or dicarboxylic acids and the metallic salts can be either soluble or insoluble in the organopolysiloxane. Preferably, the salts employed are soluble in the organopolysiloxane since this facilitates the uniform dispersion of the salt in the reaction mixture.

Illustrative of metal salts which can be employed are, for example, zinc naphthenate, lead naphthenate, cobalt naphthenate, iron - 2 - ethylhexoate, cobalt octoate, zinc octoate, lead octoate, chromium octoate and tin octoate. Metal salts operative in the practice of the present invention include those in which the metallic ion contains a hydrocarbon substituent, such as, for example, carbomethoxyphenyl tin trisuberate, isobutyl tin triceroate, cyclohexenyl lead triacotinate, xenyl lead trisalicylate, dimethyl tin dibutyrate, dibutyl tin diacetate, dibutyl tin dilaurate, divinyl tin diacetate, dibutyl tin dibenzoate, dibutyl tin dioctoate, dibutyl tin maleate, dibutyl tin adipate, diisoamyl tin bis-trichlorobenzoate, diphenyl lead diformate, dibutyl tin dilactate, dicyclopentyl lead bis-monochloroacetate, dibenzyl lead di - 2 - pentanoate, diallyl lead di - 2 - hexenoate, triethyl tin tartrate, tributyl tin acetate, triphenyl tin acetate, tricyclohexyl tin acrylate, tritolyl tin terephthalte, tri-n-propyl acetate, tristeryl lead succinate, trinaphthyl lead p-methylbenzoate, trisphenyl lead cyclohexenyl acetate, triphenyl lead ethylmalonate, basic dimethyl tin oleate, etc.

The amount of the metal salt of the organic carboxylic acid which can be employed is a function of the increased rate of curing desired so that any amount of such salt up to the maximum effective amount for increasing the cure rate can be employed. In general, no particular benefit is derived from employing more than about 5% by weight of such metal salt based on the weight of the organopolysiloxane base polymer. Preferably, where such metal salt is employed, it is present in an amount equal to from about 0.01% to 2.0% by weight, based on the base polymer.

The compositions of the present invention can also be varied by the incorporation of various extenders or fillers. Illustrative of the many fillers which can be employed with the above compositions are titanium dioxide, lithopone, zinc oxide, zirconium silicate, silica aerogel, iron oxide, diatomaceous earth, calcium carbonate, fumed silica, precipitated silica, glass fibers, magnesium oxide, chromic oxide, zirconium oxide, aluminum oxide, crushed quartz, calcined clay, asbestos, carbon, graphite, cork, cotton, synthetic fibers, etc. When fillers are added to the compositions of the present invention, they are generally employed in amounts of from about 10 to 200 parts filler per 100 parts of the organopolysiloxane base polymer.

In addition to the modification of the compositions of the present invention by the addition of metal salt cure accelerators and fillers, these compositions can also be modified by the incorporation of various flame retardants, stabilizing agents and plasticizers. Suitable flame retardants include antimony oxide, various polychlorinated hydrocarbons and organic sulfonates.

Where the compositions of the present invention contain components other than dialkoxydiacyloxysilane, the organotriacyloxysilane and the base fluid, the various ingredients can be added in any desired order. However, for ease of manufacturing it is often convenient to form a blend or mixture of all of the components of the room temperature vulcanizing organopolysiloxane except the dialkoxydiacyloxysilane and the organotriacyloxysilane, to then remove moisture from the resulting mixture by maintaining the mixture under vacuum, and thereafter to add the organotriacyloxysilane prior to packaging of the compositions in containers protected from moisture.

There may also be mixed into the base polymer and the ingredients a suitable pigment for injecting the desired color to the silicone rubber composition. Suitable pigments are titanium dioxide, aluminum powder, iron oxide (black), iron oxide (red) and carbon black. Usually the amount of pigment added is 0.5 to 1.0 percent by weight of the base polymer.

Once the above ingredients have been mixed together under anhydrous conditions, the resulting silicone rubber composition may then be dissolved under anhydrous conditions in an organic solvent. Alternatively, the different ingredients, such as the base polymer, dialkoxydiacyloxysilane, organotriacyloxysilane and the others may individually be added to the organic solvent under anhydrous conditions. Of the large class of organic solvents, only a few have been found suitable for the purpose of the present invention. The most preferred solvents are ethyl acetate, pentane, hexane, heptane, mineral spirits, naphtha (such as VM & P Naphtha manufactured by Shell Chemical Co.), xylene, toluene, and cyclohexane. Cyclohexane is the preferred solvent in that it has such a low toxicity value it has been found suitable for applications where the silicone rubber film is to come into contact with human skin. Thus, cyclohexane is satisfactory for dissolving the silicone rubber composition so that ear plugs may be coated with the solution to form a silicone rubber film over ear plugs.

Ethyl acetate was found to have good solubilizing properties but is unfortunately somewhat hydroscopic. Thus, if the silicone rubber solution is to have a shelf life of six months, ethyl acetate is undesirable as a solvent since it absorbs water which causes the silicone rubber composition to cure in solution after a four month period. Solvents such as xylene and toluene also have suitable solubilizing properties but are somewhat hydroscopic such that the shelf life is less than six months. Normal alcohols and ketone solvents are too hydroscopic to be used as solvents in the present invention in any case. The present invention is directed to producing solutions with generally a shelf life of at least four months and preferably of at least six months. While ethyl acetate, toluene and xylene are suitable for producing solutions with shelf lives of at least four months, they are unsuitable for producing shelf lives of at least six months. Only the other solvents disclosed above, such as cyclohexane, are suitable for producing shelf lives of at least six months. The chlorinated hydrocarbon solvents such as methylene chloride, 1,1,1-trichloroethane, are not only hydroscopic but also are unsuitable because of their toxicological properties. Thus, such chlorinated hydrocarbon solvents would be entirely unsuitable for forming silicone rubber fibers on ear plugs or other articles which come into contact with the human body.

When the thixotropic silicone rubber composition is used, the silicone rubber composition concentration in the solution may vary generally from 5 to 70 percent by weight of the mixture and preferably 40 to 60 percent by weight. At a concentration of 70 percent, the solution has the consistency of a thick paste and is quite difficult to brush onto a surface. When the concentration is below 5 percent, an insufficient amount of silicone rubber composition is applied to the surface to be coated. With the self-leveling silicone rubber composition, the concentration of the composition in the solvent may vary from 10 to 95 percent by weight of the solution and preferably 40 to 60 percent by weight. If the concentration is above 95 percent by weight, a solution is not formed and if it is below 10 percent then a sufficient amount of the silicone rubber composition cannot be applied to the surface to be coated.

As mentioned previously, the ingredients of the silicone rubber composition can individually be added to the solvent and mixed together or the ingredients may be mixed together and then dissolved in the solvent under anhydrous conditions. The solution can then be stored under anhydrous conditions for an extended period of time until it is ready for use. When it is desired to apply the silicone rubber composition, the solution is then sprayed or brushed onto the surface it is desired to coat. In the case of ear plugs or other small articles, they can simply be dipped into the solution. The coated article is then exposed to the atmosphere and the solvent evaporates away while at the same time the silicone rubber composition cures to form a film. The film reaches a tack-free state in a few minutes after the coating is applied and cures to its final physical properties in about 24 hours. The coating may be applied to the thickness desired by simply applying one coat and allowing the solvent to evaporate which takes a few minutes and then applying a second coat, a third coat, etc. These coatings of silicone rubber compositions applied in solution form have the same physical properties as if the silicone rubber composition had been applied directly without being solubilized. Further, the adhesiveness of the solubilized silicone rubber composition is the same as the undissolved rubber composition.

The above silicone rubber compositions are prepared and dissolved in the solvent under anhydrous conditions. The solution is then stored in water-tight containers until it is ready for use. The ear plugs are prepared in accordance with the teachings of the above Johnson and Sataloff application and the Lampe application. After the two-package room temperature vulcanizable silicone rubber composition which has been molded in the form of ear plugs has cured completely, which cure takes place in 24 hours, the ear plugs are simply dipped once into the one-package room temperature vulcanizable silicone rubber solution. The ear plugs are then allowed to dry for 24 hours so that the solvent may evaporate and the thin film of silicone rubber, usually about 15–20 mils in thickness, can be cured completely. Ear plugs which have been so treated have a smooth feeling across their entire surface and the thin film imparts to the ear plugs resistance to moisture and wax that is formed in the ear canal.

Suitable two-package room temperature vulcanizable silicone rubber compositions may also be dissolved in the above disclosed solvents such as cyclohexane and used to coat ear plugs and other surfaces and articles. However, the two-package silicone rubber compositions are not preferred since the cross-linking agent and the catalyst must be dissolved in the solvent just prior to the time the ear plugs or other articles are coated. It can be seen that if a limited number of ear plugs are to be coated, that a small portion of the dissolved two-package room temperature vulcanizable silicone rubber composition will be used to coat the plugs and the excess will become unusable since the silicone rubber compositions will cure in solution. A suitable two-package room temperature vulcanizable silicone rubber composition that may be dissolved in the above class of solvents and used to coat ear plugs is that disclosed in the above application of Lampe which was referred to earlier.

In order to better understand the present invention the examples below are given to illustrate the invention and are not intended to be limiting in any way. All parts are by weight unless specified otherwise.

EXAMPLE 1

A thixotropic one-package room temperature vulcanizable silicone rubber composition was prepared by mixing 100 parts of a silanol-terminated polydimethylsiloxane having a viscosity of 10,000 centipoise at 25° C. and having 810 dimethyl units with 20 parts of a methylcyclotetrasiloxane-treated fumed silica having a surface area of 200 square meters per gram. To this mixture there was added 15 parts of a hydrolyzate composed of 5 mole percent $(CH_3)_3SiO_{1/2}$ units, 70 mole percent $(CH_3)_2SiO_2$ units, 20 mole percent $(CH_3)SiO_{3/2}$ units and 0.5 weight percent silanol groups.

To 100 parts of the above base mixture there was added under anhydrous conditions 3.2 parts of methyltriacetoxysilane, 0.8 part di-t-butoxydiacetoxysilane and 0.025 part of dibutyltindilaurate.

The above mixture was dissolved in cyclohexane under anhydrous conditions by dissolving 50 parts of the mixture in 50 parts of cyclohexane. Ear plugs which were prepared in accordance with the disclosure of the Johnson and Sataloff application and the Lampe application as identified above were dipped into the solution and then exposed to the atmosphere and dried. The coating was tack-free in 55 minutes and was allowed to cure for 24 hours. After the 24 hour cure period there was obtained a smooth coating with excellent adhesiveness to the base materials and having good physical properties.

In use, the coated ear plugs were found to be resistant to moisture and wax that forms in the ear canal and to provide a tighter fit in the ear canal than was possible with the uncoated ear plug. The dipping deposited a coat of 20–25 mils on the base material forming the ear plug.

EXAMPLE 2

A self-bonding one-package room temperature vulcanizable composition was prepared by mixing 100 parts of a t-butoxy and hydroxy-terminated polydimethylsiloxane wherein the ratio of the hydroxy groups to the t-butoxy is 5.9 and the fluid has a viscosity of 1500 centipoise at 25° C. with 19 parts of a fumed silica having a surface area of 200 square meters per gram. To this mixture there is added a hydrolyzate having 5 mole percent of $(CH_3)_3SiO_{3/2}$ units, 70 mole percent $(CH_3)_2SiO$ units, 20 mole percent of $(CH_3)SiO_{3/2}$ units and 0.15 weight percent silanol groups.

Then under anhydrous conditions there is added to 100 parts of the above composition 3.6 parts of methyltriacetoxysilane, 0.9 part of t-butoxydiacetoxysilane, and 0.028 part of dibutyltindilaurate.

Under anhydrous conditions 50 parts of the above composition is dissolved in 50 parts cyclohexane. Ear plugs produced according to the disclosures of the Johnson and Sataloff application and the Lampe application are immersed or dipped into the silicone rubber solution and then exposed to the atmosphere and dried. The coating had a tack-free time of 30 minutes and the coating was allowed to cure for 24 hours. The resulting coating was smooth over its entire surface and had excellent adhesiveness to the ear plug substrate. The physical properties of the coating were good and imparted to the ear plugs enhanced resistance to moisture and ear wax. The coated ear plugs were smooth and provided a tighter fit in the ear canal than was possible with the uncoated ear plugs.

EXAMPLE 3

The self-bonding one-package room temperature vulcanizable silicone rubber compositions of Example 2 were prepared in an ASTM sheet having the dimensions of 6 inches and 6 inches and a thickness of 75 mils. The same silcone rubber composition was also dissolved in cyclohexane by forming a solution of 30 parts of cyclohexane and 70 parts of the silicone rubber composition. The solution had the following properties:

Viscosity: 2800 centipoise at 25- C.
Solids: 70 percent
Specific gravity: 0.75
Tack-free time: 30 minutes
Flash point: 32° F.
Adhesion:
   Glass—excellent
   Aluminum—excellent
   Stainless steel—excellent.

An ASTM sheet was formed from the solution having the same dimensions as the previous ASTM sheet prepared from the undissolved silicone rubber composition and their properties were compared.

| | Dissolved | Undissolved |
|---|---|---|
| Tack-free time, minutes | 70 | 30 |
| Durometer, Shore A | 19 | 21 |
| Tensile, p.s.i. | 350 | 340 |
| Elongation, percent | 610 | 610 |
| Tear, die B, lbs./in | 53 | 60 |
| Specific gravity | 1.06 | 1.07 |

It is then seen that the dissolved silicone rubber composition forms a film which has substantially the same physical properties as the cured silicone rubber composition that is formed in the uncured manner.

EXAMPLE 4

The solution of Example 3 having 30 parts of cyclohexane and 70 parts of silicone rubber composition was applied by brushing on an aluminum panel. The coating was tack-free in 30 minutes. After a 24 hour cure, excellent adhesiveness was obtained with a film thickness of 15–20 mils.

What I claim is:

1. A room temperature vulcanizable silicone rubber solution which has low toxicity and low hygroscopicity and is applied to objects and cured in situ to form a tough film over said object wherein said object comes into contact with the human skin and wherein said solution has a shelf life of at least six months comprising (a) a silicone rubber composition having (i) a base polymer of the formula,

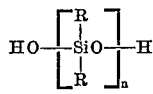

where R is a member selected from the class consisting of monovalent hydrocarbon radicals, halogenated monovalent hydrocarbon radicals, and cyanoalkyl radicals and $n$ has a value of 10 to 1,000 such that the viscosity of the base polymer varies from 8,000 to 100,000 centipoise at 25° C. and (ii) 1.0 to 6.0 percent by weight of said base polymer of an organotriacyloxysilane of the formula, R'Si(OY)$_3$ where R' is a member selected from the class consisting of monovalent hydrocarbon radicals, halogenated monovalent hydrocarbon radicals and cyanoalkyl radicals and Y is a saturated aliphatic monoacyl radical of a carboxylic acid and (b) cyclohexane in which said silicone rubber composition is present at a concentration of 5 to 70 percent by weight in said solution.

2. The solution of claim 1 wherein said solvent is present at a concentration of 40 to 60 percent by weight.

3. A room temperature vulcanizable silicone rubber solution which has low toxicity and low hygroscopicity and is applied to objects and cured in situ to form a tough film over said object wherein said object comes into contact with the human skin and wherein said solution has a shelf life of at least six months comprising (a) a silicone rubber composition having (i) a base polymer of the formula,

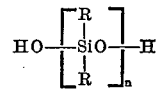

where R is a member selected from the class consisting of monovalent hydrocarbon radicals, halogenated monovalent hydrocarbon radicals, and cyanoalkyl radicals and $n$ has a value of 10 to 1,000 such that the viscosity of the base polymer varies from 1,000 to 7,000 centipoise at 25° C. and (ii) 1.0 to 6.0 percent by weight of said base polymer of an organotriacyloxysilane of the formula, R'Si(OY)$_3$ where R' is a member selected from the class consisting of monovalent hydrocarbon radicals, halogenated monovalent hydrocarbon radicals and cyanoalkyl radicals and Y is a saturated aliphatic monoacyl radical of a carboxylic acid and (b) cyclohexane wherein said silicone rubber composition is present at a concentration of 10 to 95 percent by weight in said solution.

4. The solution of claim 3 wherein said solvent is present at a concentration of 40–60 percent by weight.

5. The solution of claim 4 wherein said silicone rubber composition includes 0.01 to 2.0 percent by weight of said base polymer of a carboxylic acid salt of a metal ranging from lead to manganese, inclusive, in the electromotive series of metals.

6. The solution of claim 5 wherein said silicone rubber composition has dibutyltindilaurate therein.

7. The solution of claim 6 wherein said silicone rubber composition includes from 0.2 to 6.0 percent by weight of said base polymer of dialkoxydiacyloxysilane having the formula, (R"O)$_2$Si(OY)$_2$ where R" is a lower alkyl radical and Y has the meaning defined hereinbefore.

8. The solution of claim 7 wherein said silicone rubber composition further includes 10 to 300 percent by weight of said base polymer of a filler selected from the group consisting of titanium dioxide, lithopone, zinc oxide, zirconium silicate, silica aerogel, iron oxide, diatomaceous earth, calcium carbonate, fumed silica, silazane treated silica, precipitated silica, glass fibers, magnesium oxide, chromic oxide, zirconium oxide, aluminum oxide, crushed quartz, calcined clay, asbestos, carbon, graphite, cotton and synthetic fibers.

References Cited

UNITED STATES PATENTS

| | | | |
|---|---|---|---|
| 3,296,161 | 1/1967 | Kulpa | 260—18 |
| 3,427,270 | 2/1969 | Northrup | 260—29.1 |
| 3,035,016 | 5/1962 | Bruner | 260—46.5 |
| 3,133,891 | 5/1964 | Seyzeriat | 260—18 |
| 3,240,731 | 3/1966 | Nitzsche et al. | 260—18 |

DONALD E. CZAJA, Primary Examiner

M. I. MARQUIS, Assistant Examiner

U.S. Cl. X.R.

117—135.1, 161 ZA; 128—152; 260—18 S, 31.2 R, 33.6 SB, 37 SB, 46.5 G, 825

PO-1050
(5/69)

UNITED STATES PATENT OFFICE
CERTIFICATE OF CORRECTION

Patent No. 3,701,753                    Dated December 20, 1974

Inventor(s)     Harvey P. Shaw

It is certified that error appears in the above-identified patent and that said Letters Patent are hereby corrected as shown below:

Column 4, line 5, delete "organotriaryloxysilanes" and substitute therefore  - organotriacyloxysilanes -

Column 4, line 9, after "the" insert - most -

Column 5, line 45, delete "xenyl" and substitute therefore - hexenyl -

Column 7, line 4, delete "fibers" and substitute therefore - coatings -

Signed and sealed this 4th day of March 1975.

(SEAL)
Attest:

RUTH C. MASON
Attesting Officer

C. MARSHALL DANN
Commissioner of Patents
and Trademarks